June 8, 1948.   W. H. GLAZER   2,442,849
OPHTHALMIC LENS
Filed July 11, 1944   2 Sheets-Sheet 1

INVENTOR
William H. Glazer
BY
Harry Langsam
ATTORNEY

June 8, 1948. W. H. GLAZER 2,442,849
OPHTHALMIC LENS
Filed July 11, 1944 2 Sheets-Sheet 2

INVENTOR.
WILLIAM H. GLAZER
BY Harry Langsam
ATTORNEY.

Patented June 8, 1948

2,442,849

UNITED STATES PATENT OFFICE 2,442,849

OPHTHALMIC LENS

William H. Glazer, Philadelphia, Pa., assignor of ten per cent to Harry Langsam, Philadelphia, Pa.

Application July 11, 1944, Serial No. 544,390

1 Claim. (Cl. 88—54)

My invention relates to ophthalmic lenses and relates particularly to a method for producing balanced binocular vision into one or more zones or areas of use away from the limited central zone of use in the lens. This is a continuation in part of my application Serial No. 433,150, filed March 3, 1942, now abandoned.

Prismatic differences in ophthalmic lenses, may unless corrected, disrupt binocular function, create intolerable eye strain, create double vision, and progressively cause the loss of sight in one eye; or the prismatic differences may invite or facilitate the progress of an ocular pathology by establishing a perverted physiology; and it is not unreasonable to assume that remote and unsuspected disturbances, flowing from a constant cerebral irritation, may be linked to the uncorrected prismatic differences.

It is an object of my invention to provide ophthalmic balanced binocular vision into one or more zones of use away from the limited central zone of use.

Another object of my invention is to provide an accurate manner of grinding an optical lens which will have a specified prism in an annular zone away from the central zone.

Another object of my invention is to provide a constant optical prismatic value in different annular areas of an ophthalmic system of lenses.

Other objects of my invention are to provide an improved device of the character described, that is easily and economically produced, which is sturdy in construction, and which is highly efficient in operation.

With the above and related objects in view, my invention consists in the details of construction and combination of parts, as will be more fully understood from the following description, when read in conjunction with the accompanying drawing, in which.

For the purpose of better illustrating the application of my invention to ophthalmic lenses, I shall analyze how prismatic differences occur in an illustrative prescription:

R. E. _____ 5.00 D. S.     L. E. _____ 2.00 D. S.
(Right eye) (Diopter         (Left eye)
              sphere)

If the above prescription is filled by the ordinary process of grinding lenses and taking a possible tolerable limiting prism difference of one prism-diopter (abbreviated $\Delta$ or P. D.) for binocular function, the binocular zonal limit will be on a radius extending 3½ millimeters from the center of the lens. The limiting prism difference of one prism diopter for binocular function is determined in accordance with Prentice's law for calculating prismatic effects of ophthalmic lenses.

Prentice's law:
$P = Fx$ distance
P in prism-diopter
F in refraction-diopters for each lens times distance in centimeters from optical center.

Therefore, the central zone diameter or usefulness, having a one-prism diopter of difference as the limit of optical difference in the vertical meridian is not more than six and two-thirds millimeters.

The limit of vertical prismatic differences where intolerable double vision must occur is three prism-diopters, based on physiological law as applied to young, healthy, vigorous eyes.

In the prescription above set forth, the limit of three prism-diopters of vertical prismatic difference occurs at a point ten millimeters below or above the optical center of the correction system; and the ten millimeters point of three prism-diopters of prismatic difference is a common point of binocular use for reading.

Assuming that the desired distance above and below the optical centers where binocular vision is to take place, as in the act of reading or for some other occupational purpose, is ten millimeters, it is necessary to efficiently grind the ophthalmic lens and to produce a definite prismatic action at the prescribed distance away from the optical center of the lens, which system of ophthalmic lenses will satisfy or create prismatic balance at the prescribed distance away from the optical center of the system.

Further assuming that we are given a definite radius of curvature as for the second surface of a prescribed lens where $$R_2 = -\frac{n'-n}{F_2}.$$

the problem is to introduce the prism of given magnitude and direction beginning at a specified distance from the optical center, in this instance, 5 millimeters.

Figure 1:
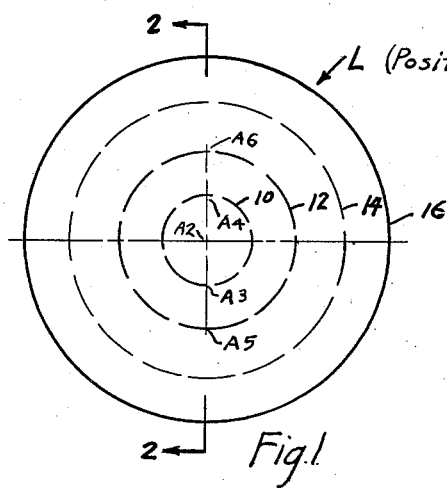
Fig. 1 is a front view of an ophthalmic lens showing different corrected zones of usefulness.
Figure 2:
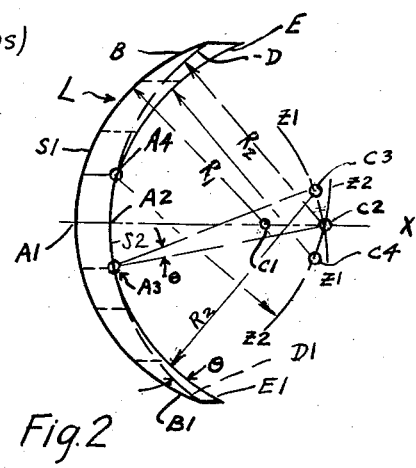
Fig. 2 is a sectional view taken along the line 2—2 of Fig. 1 and showing in addition to the aforementioned the various centers of curvatures on the lens.
Figure 3:
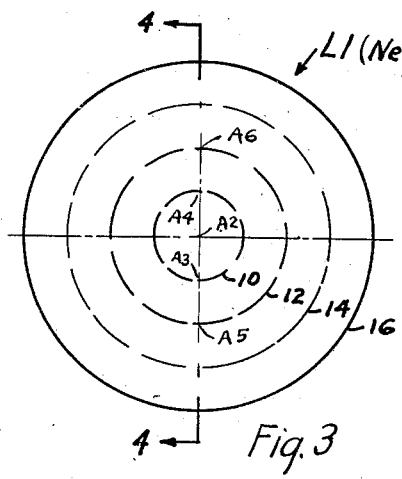
Fig. 3 shows a front view of an ophthalmic lens wherein the image is for a negative lens.
Figure 4:
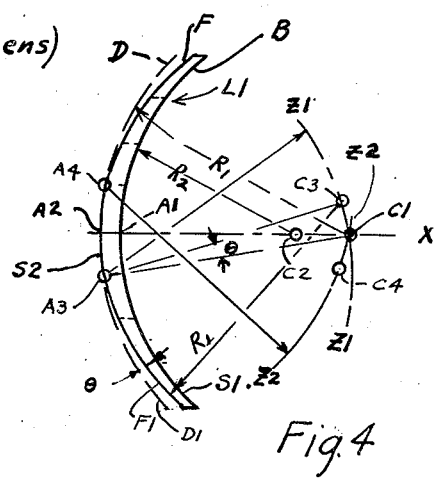
Fig. 4 is a sectional view taken along the line 4—4 of Fig. 3 wherein the various centers of curvature for the lens are shown.
Figure 5:
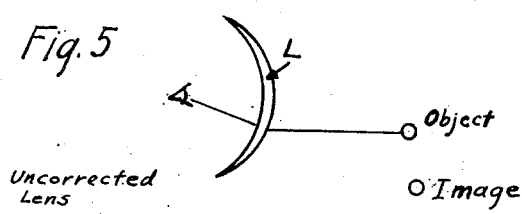
Fig. 5 is a side elevational view of an ophthalmic lens having the central zone of the same refractive power as the lens in Fig. 6 but wherein the outer zone is uncorrected, thus showing that the image is displaced at a greater relative distance from the object than the corrected lens of Fig. 5.
Figure 6:
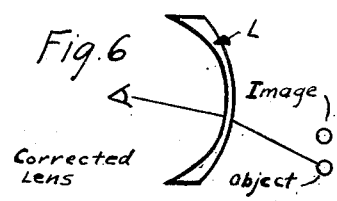
Fig. 6 is a side elevational view through an ophthalmic lens showing in exaggerated position an image of an object slightly displaced from the object.
Figure 7:
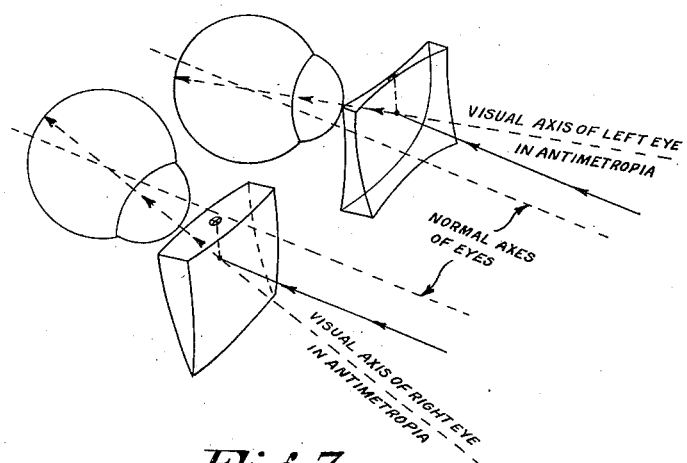
Fig. 7 is a perspective view of a pair of eyes in antimetropia and a pair of eyeglasses for such eyes of the prior art type.
Figure 8:
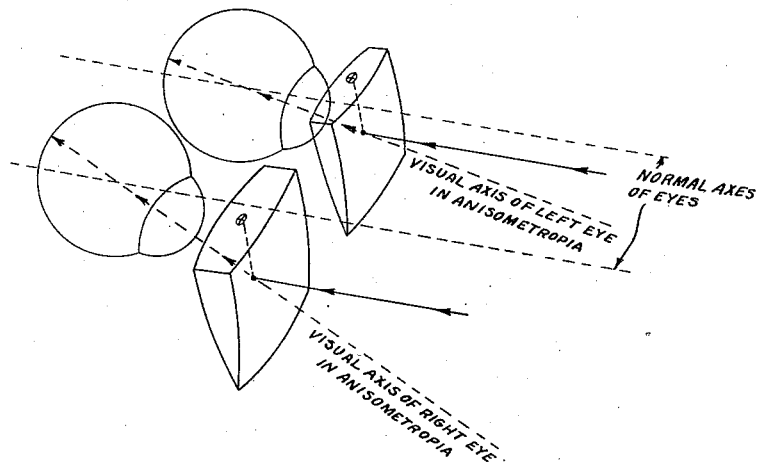
Fig. 8 is a perspective view of a pair of eyes in anisometropia and glasses therefor, wherein the eyes are under binocular muscle strain in eccentric vision.

$R_2$—the inner radius of curvature
$n'$—index of lens
$n$—index of air
$F_2$—refracting power of second surface of lens Referring to the drawing, in Figs. 1 and 2, the lens L is a plus or positive lens where a real image appears, and Figs. 3 and 4 is a negative lens L1 wherein a virtual image appears. The optic axis of each lens is represented by the straight line A2X. The centers of curvature of both lens surfaces S1 and S2 of the lens lies on the straight line A2X. The center of curvature of lens surface S1 is C1 and the center of curvature of lens surface S2 is C2. An arc B, B1 having a radius R1 is drawn so that the center C1 of the arc is on the straight line A2X. An arc D, D1 forming the curvature of a part of the surface S2 has a radius C2A2 which equals R2. With A2 as a center and using a radius of 5 millimeters, draw a circle concentric in respect to the center of the lens, as in Fig. 1. With a radius R2 which is the radius of curvature of the surface D, A2, D1 and with centers at A3 and A4, describe auxiliary arcs Z1Z1 and Z2Z2 intersecting at C2, Fig. 2.

The lens surface S1 in section is shown by an arc designated as B1—B1, and the radius C1A1 of the arc B—B1 is designated as R1 with its center at C1 on the horizontal line A2X. The second lens surface S2 in section is shown by an arc designated as D—D1, and the radius C2A2 of the arc D—D1 is designated as R2 with its center on the horizontal line A2X.

A central circle 10 is drawn on the representation of the surface of the lens with a radius of 5 millimeters as shown in Figs. 1 and 3. This central circle 10 designates the limits of the diopter power of the lens as originally found, and will not be altered.

To produce in each lens a balanced prismatic effect, it is necessary to alter the deviation of the light rays through the area outside of the central zone of the lens. This alteration of the lens outside of the central zone is brought about in the following manner:

An auxiliary arc Z1Z1 is drawn by using a radius R2 equal to the distance between C2A2, but wherein the lowermost point A3 of circle 10 on the surface S2 is used as the center of the auxiliary arc Z1Z1.

A second auxiliary arc Z2Z2 is drawn by using a radius R equal to the distance between C2A2, but wherein the uppermost point A4 on the circle 10, on the surface S2, is used as the center of the auxiliary arc Z2Z2. The arcs Z1Z1 and Z2Z2 intersect substantially on the centerpoint C2 in the case of the positive lens, Fig. 2, and on the center point C1 in the case of the negative lens, Fig. 4.

It is an optically derived formula that the power of a prism in prism-diopters (10) is (Southall, page 137) $p = (n'-1)B \times 1.745$ (where B is the refracting angle of any prism in degrees).

If $\theta$ equals $B \times 1.745$, then it is also equal to $p/(n'-1)$ prism-diopters, the value of the reduction prism required.

$$\Delta = F \times Cm$$

where $\Delta$ = induced prismatic effect of a lens
$F$ = power of a lens
$Cm$ = decentration from the center of lens in centimeters The conversion factor 1.745 in the formula is obtained in the following manner: The radian equals 57.4 degrees. The hundredth part of a radian equivalent to one prism diopters is 0.57 degree; or one degree is equal to 1.745 prism diopters. If the refracting angle is given in degrees, then its equivalent in prism-diopters is that angle in degrees multiplied by 1.745.

Thus, if $p$ is 3 prism-diopters, then $\theta$ the reduction angle in prism-diopters is $3/(n'-1)$; and if $n'$, the index of optical glass is 1.523, $\theta$ equals 3/0.523, or 5.75 prism-diopters.

Finally, since 1 prism-diopter is equivalent to 1/100 radian, 5.75 prism-diopters is equivalent to 0.0575 radians. The length of the arc equals the radius of the surface multiplied by the angle subtended, when the angle is measured in radians. Arc=$R \times \sphericalangle$ radians. Therefore, an arc C2C3 for a radius of surface S2 of 86.66 millimeters is 86.66 mm.×0.0575, or 4.98 millimeters; that is, the length of arc C2C3 is 4.98 millimeters. That is the length of the arc C2C3 is obtained by mathematical calculation and the point C3 is obtained by stepping off the length of the arc C2C3 along the arc Z1C2.

With C3 thus determined, and as a center, and with a radius R2=C2A2, strike off arc A3E1. Angle B1A3E1 equal to $\theta$, the required reduction prism in prism-diopters.

In the same manner, the locus of C4 on the auxiliary arc C2Z2 for determining the surface A4E is obtained.

In Figs. 2 and 4, the angle $\theta$ is shown as the reduction angle, that is the angle by which the outer edge of the positive lens of Fig. 2 is increased and the outer edge of the negative lens of Fig. 4 is decreased. The angle $\theta$ is calculated, as hereinbefore described in considerable detail, so that the length of the arc, in radians, C2C3 is obtained by calculation—likewise the length of the arc C1,C4 along the arc Z2Z2 locates the same reduction angle for the upper edge of the lens. After the reduction angle $\theta$ is found and located on Figs. 2 and 4, suitable arcs may be drawn for forming the exact and correct shape of the lens surface away from the center of the lens.

Although the reduction angle $\theta$ is shown, in Figs. 2 and 4, as appearing on a plane the reduction angle is placed around the entire edge, outwardly of the central circle 10 for correction purposes.

Hence, the required lens L having the required balanced zones will have a curvature of arc B1, A1, B1 as one surface and a second surface defined by the arcs E, A2, and E1, as in Fig. 2, with the required thickness of the lens as determined by the above-defined procedure.

With the above-defined necessary information, templates may be formed of each defining surface so the lens grinder may simultaneously grind the central zone and the peripheral zone, using the templates obtained. The template formed has the configuration in cross section of one of the inner or outer surfaces as illustrated in Figs. 1 to 4 inclusive for the purpose of grinding that particular surface of the lens. Thus, the finished lens carries the required balancing prism of constant magnitude throughout the entire peripheral segment of the lens, thereby achieving balanced binocular vision in more than one zone of probable use.

The practical effect of the lens ground according to the above-defined procedure is that it creates a lens of central circular zone used for binocular purposes up to the radius of the limiting prismatic difference, and an annular zone of use bounded by top and bottom limits.

According to the attached analysis, Examples I, II and III, of several types of corrections, it will be seen that not only are the vertical and horizontal prismatic differences composed throughout the entire field of binocular use where the corrections are dissimilar spherical powers, it is shown also in rather extreme astigmatic correction differences that the vertical differences are at least best composed throughout the entire field by the grinding of the second surface with the tool above set forth. This type of tool can be utilized in all prescriptions where the prismatic difference in the vertical meridian is one-half prism-diopter or more.

It should be noted that this mode of lens development creates a reduction in the total prism in the lens of maximum plus power. In effect, there is introduced a base-down prism required to balance the difference in induced prismatic effects of the two lenses. Physiologically and hygienically, this is desirable, because it obviates maximum, though balanced, depression of the two eyes if the prism were ground base-up in the weaker lens.

For the same reason, this mode of lens development treats the first surface of the lens of maximum minus power, reducing the maximum base-down effect of the balanced pair of lenses.

Where the difference in powers of the two correction lenses is considerable, these reduction effects are increasingly important for the reasons above given.

Not only does this mode of lens development take into account balancing of the prismatic effects of a binocular optical correction system for a specific purpose, as for binocular function in the act of reading; simultaneously, it affords the best possible maintenance of the binocular function into the oblique fields, as when looking downward to the right or to the left at angles 45° or 135° with a constant radius as the center of limits of tolerance.

The attached sheets show an analysis of several types of prescriptions, which are Examples I, II and III, giving the prismatic effects at co-ordinates $r$, 8 mm.-G, 45 and 135 degrees. Also, there is shown the resolved prismatic effects at these co-ordinates of a constant balancing prism required as a first demand to satisfy balance of the vertical prismatic differences induced by the prescription lenses.

There is shown the individual net prismatic effects of each lens, as a summation; then there is shown the net prismatic effects of the binocular system for the given co-ordinates. Finally, there is shown the net effects for the given co-ordinates where no attempt at prismatic balance occurs as occurs today as a matter of almost universal ignorance of these effects when prescribing ophthalmic lenses.

In Figs. 3 and 4 where a minus lens is illustrated, not only is a lens produced having a balanced system, but the lens has a reduced peripheral thickness. The lens also has a wider field with a minimum deviation in symmetry (ordinary balanced system, i. e. when the correction for each eye is the same but of unusually high negative power). Thus, O. U. prescription for both eyes—6.00 (D. S.) at 10 mm. down or up, the induced symmetric prism value for each lens is 6.00 prism diopters, base-down. With the above-mentioned correction, the edge thickness and total deviation may be reduced at will.

In Figs. 3 and 4, the same reference characters as used in Figs. 1 and 2 indicate the same centers, distances, radius of curvature, arcs, surfaces and zones with the following exceptions—the arcuate surfaces F and F1, which are the corrective surfaces for a negative lens obtained by the same method as the corrective surface E of Fig. 2 is found. However, in the negative lens of Fig. 4, the corrective surfaces F and F1 reduce the outer thickness of the uncorrected lens, whereas the corrective surfaces E and E1 in the positive lens add to the outer thickness of what would be the uncorrected lens. The center C3 in both Figs. 2 and 4 locate the surfaces E1 and F1, respectively, and the center C4 locates the outer surfaces E and F in Figs. 2 and 4, respectively.

From the limits of permissible prism-difference on circle 10 to the new zone of binocular use, there will be an area of transition with prismatic effects which are tolerable; the transition zone occurs between point A3 on circle 10 and point A5 on circle 12 in the lower hemisphere and between point A4 on circle 10 and point A6 on circle 14 in the upper hemisphere. By virtue of the correction hereinbefore applied the area defined between circles 12 and 14 possesses a satisfactory prismatic balance which is comparable to the central zone. Between circle 14 and the periphery 16 of each lens L and L1 is an uncorrected zone which may be removed.

Hence, the zone between circles 12 and 14 contains the zone of entire balance in its median and the permissible prism-difference in the zonal limits.

It should be understood that in no sense is this lens to be regarded as a bifocal. The refracting power throughout the lens remains unaltered; but the prismatic powers are so controlled as to establish prismatic balance with the other lens into specified points of binocular use away from the center.

Example I

Rx.: R. E., 200 D. S.   L. E., 5.00 D. S.
    (Right eye)      (Left eye)

Lower right divergence-convergence (r, 8 mm.-θ, 45°) (co-ordinates)

1. R. E. — 1.14 prism base up — 1.14 prism base in
2. L. E. — 2.85 prism base up — 2.85 prism base out
3. Resolved 2.4 prism, left lens — 1.80 prism base down — 1.80 prism base out
4. Net, left prism — 1.05 prism base up — 1.05 prism base out
5. Net, for system — 0.09 prism base up (R) — 0.09 prism base in
6. No zonal correction (net O. U.) (both eyes) — 1.71 prism base up (L) — 1.71 prism base out (L)

Lower left divergence-convergence (r, 8 mm.-θ, 135°)

1. R. E. — 1.14 prism base up — 1.14 prism base out
2. L. E. — 2.85 prism base up — 2.85 prism base in
3. Resolved 2.4 prism, left lens — 1.80 prism base down — 1.80 prism base out
4. Net left prism — 1.05 prism base up — 1.05 prism base in
5. Net, for system — 0.09 prism base up — 0.09 prism base out
6. No zonal correction (net O. U.) — 1.71 prism base up (L) — 1.71 prism base in (L)

A comparison of 5 and 6 shows at a glance the enormous advantage of a complete zonal prismatic balance at given co-ordinates.

Example II

Rx.: R. E.+3.00 D. S.+1.00 axis 1.80 D. C.
    (Diopter spherical) (Diopter cylindrical)
    L. E.+2.00 D. S.+0.50 axis 90 D. C.

Lower right divergence-convergence r, 8 mm.-θ, 45°

1. R. E. (D. S.) — 1.74 prism base up — 1.74 prism base in
2. R. E. (D. C.) — 0.58 prism base up — 0.58 prism base in
3. Total (r) — 2.32 prism base up — 2.32 prism base in
4. L. E. (D. S.) — 1.16 prism base up — 1.16 prism base out
5. L. E. (D. S.) — 0.00 prism base up — 0.29 prism base out
6. Total (L.) — 1.16 prism base up — 1.45 prism base out
7. Resolved prism, right (1.2) — 0.58 prism base down — 0.58 prism base out
8. Net, for system — 0.58 prism base up (R) — 0.29 prism base in
9. Net, right prism R. E. — 1.74 prism base up — 1.74 prism base in
10. No zonal correction (net O. U.) — 1.16 prism base up — 0.87 prism base in Lower left divergence-convergence r, 8 mm.-θ, 135°

1. R. E. (D. S.) — 1.74 prism base up — 1.74 prism base out
2. R. E. (D. C.) — 0.58 prism base up — 0.58 prism base out
3. Total (R.) — 2.32 prism base up — 2.32 prism base out
4. L. E. (D. S.) — 1.16 prism base up — 1.16 prism base out
5. L. E. (D. C.) — 0.00 prism base up — 0.29 prism base in
6. Total (L.) — 1.16 prism base up — 1.45 prism base in
7. Resolved prism, right (1.2) — 0.58 prism base down — 0.58 prism base in
8. Net, for system — 0.58 prism base up — 0.29 prism base in
9. Net, right prism — 1.74 prism base up — 1.74 prism base out
10. No zonal correction (net O. U.) — 1.16 prism base up — 0.87 prism base out

Example III

Rx.: R. E.−050 D. S.  ( )−1.75 D. C. axis 60
    L. E.−0.75 D. S.  ( )+7.00 D. C. axis 15

Lower right divergence-convergence r, 8 mm.-θ, 45°

1. R. E. (D. S.) — 0.29 prism base down — 0.29 prism base out
2. R. E. (D. C.) — 0.18 prism base up — 0.32 prism base out
3. Total (R.) — 0.11 prism base down — 0.61 prism base out
4. L. E. (D. S.) — 0.43 prism base down — 0.43 prism base in
5. L. E. (D. S.) — 2.65 prism base up — 0.43 prism base in
6. Total (L.) — 2.22 prism base up — 1.20 prism base in
7. Resolved prism, 525 left — 3.80 prism base down — 3.80 prism base in
8. Net, left prism — 1.58 prism base down — 5.00 prism base in
9. Net, for system — 1.47 prism base down — 4.39 prism base in
10. No zonal correction (net O. U.) — 2.33 — 0.59

Lower left divergence-convergence 4.8 mm.-θ, 135°

1. R. E. (D. S.) — 0.29 prism base down — 0.29 prism base in
2. R. E. (D. C.) — 0.67 prism base down — 1.12 prism base in
3. Total (R.) — 0.96 prism base down — 1.41 prism base in
4. L. E. (D. S.) — 0.43 prism base down — 0.43 prism base in
5. L. E. (D. C.) — 4.55 prism base up — 1.20 prism base in
6. Total (L.) — 4.12 prism base up — 1.63 prism base in
7. Resolved prism, 5.25 — 3.80 prism base down — 3.80 prism base out
8. Net left prism — 0.32 prism base up — 2.17 prism base out
9. Net for system — 1.28 prism — 0.76 prism
10. No zonal correction (net O. U.) — 5.08 prism — 3.04 prism base in It is to be observed that correction for each lens is made, but the value of the corrections is dependent upon the binocular system of both eyes, when both lenses are considered. Hence, it is to be noticed that the prismatic effect of each lens is controlled to establish prismatic balance between both lenses in a specified zone of binocular use away from the center of each lens. The correction made to each lens, as has been described and illustrated in Figs. 2 and 4, has been particularly applied to an individual lens, but it is to be remembered that the making of the lens has been dependent upon the binocular system of both eyes.

Figs. 2 and 4 show sectional views but the application of the prismatic change is applied to the annular or circumferential surface of each lens around the entire lens, and away from the center of the lens; or the shape of the lens is that of a segment of a sphere.

Although my invention has been described in considerable detail, such description is intended as illustrative rather than limiting, since the invention is to be determined as claimed.

I claim as my invention:

A pair of prescribed ophthalmic lenses having a considerable difference of power therebetween for binocular use in front of a person's eyes, each lens having a central zone of vision and at least one of said lenses having a modified peripheral concentric annular zone having the same power as the central zone, said peripheral zone constructed to reduce the difference in prismatic power between the two lenses as ordinarily encountered when the eyes are directed through peripheral portions of said lenses in substantially all meridians, said peripheral zone of said last mentioned lens being continuous with and contiguous to the limit of the central zone, said modified annular zone having its surface at the same radius of curvature as that of the central zone but having offset centers of curvatures displaced eccentrically to the center of curvature of the central zone whereby the induced prismatic difference between the two lenses when viewing an object binocularly through said peripheral zone does not exceed approximately one prism-diopter.

WILLIAM H. GLAZER.

REFERENCES CITED

The following references are of record in the file of this patent:

UNITED STATES PATENTS

| Number | Name | Date |
|---|---|---|
| 836,486 | Conner | Nov. 20, 1906 |
| 932,965 | Conner | Aug. 31, 1909 |
| 1,286,032 | Laisne | Nov. 26, 1918 |
| 1,302,960 | Paige | May 6, 1919 |
| 1,340,715 | Hill | May 18, 1920 |
| 1,393,853 | Tillyer | Oct. 18, 1921 |
| 1,569,258 | Bugbee | Jan. 12, 1926 |
| 1,731,419 | Hill et al. | Oct. 15, 1929 |
| 2,040,242 | Courmetles | May 12, 1936 |
| 2,077,092 | Broder | Apr. 13, 1937 |
| 2,101,016 | Beach | Dec. 7, 1937 |
| 2,109,474 | Evans | Mar. 1, 1938 |
| 2,310,925 | Bardwell | Feb. 16, 1943 |

OTHER REFERENCES

Bugbee (pub.) "Bifocals" (One Piece Bi-focal Lens Co., Indianapolis, Indiana, 1923), 76 pages—pages 39 and 40 especially cited.